United States Patent
Fujino (10) Patent No.: US 7,905,086 B2
(45) Date of Patent: Mar. 15, 2011

(54) METHOD FOR CONTROLLING DESULFURIZATION IN EXHAUST GAS PURIFICATION SYSTEM, AND EXHAUST GAS PURIFICATION SYSTEM

(75) Inventor: Ryusuke Fujino, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 363 days.

(21) Appl. No.: 11/989,527

(22) PCT Filed: Aug. 7, 2006

(86) PCT No.: PCT/JP2006/315595
§ 371 (c)(1),
(2), (4) Date: Jan. 28, 2008

(87) PCT Pub. No.: WO2007/029439
PCT Pub. Date: Mar. 15, 2007

(65) Prior Publication Data
US 2009/0260348 A1  Oct. 22, 2009

(30) Foreign Application Priority Data
Sep. 7, 2005 (JP) ................................. 2005-258974

(51) Int. Cl.
*F01N 3/00* (2006.01)
(52) U.S. Cl. ................. 60/286; 60/274; 60/285; 60/295; 60/301
(58) Field of Classification Search ............ 60/284–287, 60/295–301, 277
See application file for complete search history.

(56) References Cited

U.S. PATENT DOCUMENTS

| 6,089,017 A * | 7/2000 | Ogawa et al. .................. 60/285 |
| 2005/0027431 A1 * | 2/2005 | Todoroki et al. .............. 701/105 |
| 2005/0102998 A1 * | 5/2005 | van Nieuwstadt et al. ..... 60/277 |

FOREIGN PATENT DOCUMENTS

EP    1515013    3/2005
(Continued)

OTHER PUBLICATIONS

International Search Report (PCT/ISA/210) mailed Oct. 17, 2006 in connection with the International Application PCT/JP2006/315595.
(Continued)

*Primary Examiner* — Binh Q Tran
*Assistant Examiner* — Jesse Bogue
(74) *Attorney, Agent, or Firm* — Staas & Halsey LLP (57) ABSTRACT

An exhaust gas purification system having a NOx conversion catalyst device with a catalyst supported thereon for conversion of NOx in the exhaust gas. In order to accurately introduce a fuel in a necessary and sufficient amount for raising the temperature for allowing the NOx conversion catalyst device to be brought to a desulfurization target temperature, even during transient operation to maintain the state of the device at a temperature of the desulfurization target or above, an amount of fuel necessary for raising a first detection temperature as an indicator of the catalyst temperature to a desulfurization target temperature is set using a heat quantity computed from a first heat quantity necessary for raising the temperature of the NOx conversion catalyst device and a second heat quantity necessary for raising the temperature of the exhaust gas.

6 Claims, 5 Drawing Sheets

FOREIGN PATENT DOCUMENTS

| | | |
|---|---|---|
| JP | 10-8950 | 1/1998 |
| JP | 2000-54900 | 2/2000 |
| JP | 2001-227325 | 8/2001 |
| JP | 2003-500594 | 1/2003 |
| JP | 2003-336518 | 11/2003 |
| JP | 2004-92445 | 3/2004 |
| JP | 2005-90274 | 4/2005 |
| WO | 00/71877 | 11/2000 |

OTHER PUBLICATIONS

Patent Abstracts of Japan, Publication No. 2003-336518, Published Nov. 28, 2003.
Patent Abstracts of Japan, Publication No. 2004-092445, Published Mar. 25, 2004.
Patent Abstracts of Japan, Publication No. 2000-054900, Published Feb. 22, 2000.

* cited by examiner

METHOD FOR CONTROLLING DESULFURIZATION IN EXHAUST GAS PURIFICATION SYSTEM, AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/315595, filed Aug. 7, 2006 and Japanese Application No. 2005-258974 filed Sep. 7, 2005 in Japan, the contents of which are incorporated herein by reference.

FIELD OF THE INVENTION

The present invention relates to a desulfurization control method and an exhaust gas purification system in an exhaust gas purification system that includes a NOx (oxides of nitrogen) conversion catalyst device which supports a NOx conversion catalyst that purifies the NOx in the exhaust gas of an internal combustion engine.

DESCRIPTION OF THE RELATED ART

A wide variety of research has been conducted and many proposals have been advanced regarding NOx catalysts for reducing and eliminating NOx from the exhaust gases of internal combustion engines such as diesel engines and some gasoline engines as well as other various combustion devices. One of these is the NOx occlusion reduction type catalyst used as a NOx conversion catalyst for diesel engines. With this catalyst NOx in exhaust gas can be effectively removed.

With this NOx occlusion reduction type catalyst, when the air/fuel ratio is in a lean state, the $NO_2$ is occluded to a metal such as Barium (Ba) having the property of occluding NOx after NO (nitrogen monoxide) is oxidized to $NO_2$ (nitrogen dioxide). However, because the occlusion capability of NOx may become saturated, NOx regeneration control in which the air/fuel ratio is put into a rich state is carried out before saturation, $NO_2$ is released from the occluded material, and the released $NO_2$ is reduced to $N_2$ (nitrogen) using HC (hydrocarbon) and CO (carbon monoxide) as reducing agents. Through using alternately these catalyst reaction mechanisms, the NOx in the exhaust gas is eliminated.

However, there exists the problem of performance deterioration due to sulfur poisoning with regard to this NOx occlusion reduction type catalyst. That is, the sulfur contained in the fuel becomes $SO_2$ (sulfur dioxide) through combustion, this $SO_2$ becomes occluded to the occlusion material in a manner similar to $NO_2$ and a sulfur salt such as $Ba_2SO_4$ (barium sulfate) is produced. As a result, the occlusion capability of the NOx in the occlusion material is reduced and the NOx purification rate is deteriorated.

Consequently, in order to maintain the initial NOx purification performance, in addition to recovering the occlusion capability of the NOx through NOx regeneration control, it is imperative to eliminate the sulfur part adhering and occluding in the catalyst and release it. For this elimination and release, that is, desulfurization, it is necessary to have the atmosphere in which the exhaust gas is composed into the state for reducing and a temperature is above a certain value. Consequently, it is necessary to carry out timely desulfurization control (sulfur purge control) to make the atmosphere of rich and high temperature so as to create an environment in which sulfates are easily decomposed. In this desulfurization control, differences do exist depending on the catalyst, but unless the state becomes a state in which is rich and high temperature of generally 600° C. to 700° C., the sulfate will not be decomposed and will not discharge $SO_2$.

Consequently, as described in the Japanese Patent Application Kohyo Publication No. 2003-500594, the Japanese Patent Application Kokai Publication Nos. 2003-336518, 2004-92445 and 2000-54900, in addition to having the flow rate of the exhaust gas reduced by the air intake throttle in the engine and the heat capacity reduced, the temperature of the exhaust gas is raised through the control of fuel injection by multi-injection or post injection in the cylinders, or through oxidizing the unburned fuel provided in the exhaust gas by post injection or by direct fuel injection into the exhaust pipe, on the oxidation catalyst positioned upstream of the NOx occlusion reduction type catalyst. And the high temperature and rich condition is produced.

In this desulfurization control, the NOx occlusion reduction type catalyst must be maintained at a high temperature for a long time. Additionally, because the temperature maintained in the desulfurization control is also close to the temperature limit at which the NOx occlusion reduction type catalyst is thermally deteriorated, it is necessary as far as possible to prevent any fluctuation in the temperature.

However, the follow-up problem given below exists in the map control in which, such as that conducted with conventional technology, referring to map data set up beforehand from engine speed and engine load, and calculating the amount of fuel for raising temperature that will be used only for raising the temperature of the exhaust gas, a post injection or a direct injection into the exhaust pipe is conducted with this amount of fuel for raising temperature.

That is, in this map control, a desulfurization control is carried out normally for about 30 minutes to 40 minutes at a high temperature of 600° C. to 700° C. with the excess air ratio in an approximately 0.9 rich condition. As a result, it is difficult to maintain a steady operating state of the vehicle with the engine in the period of this desulfurization control, and the vehicle often goes into a transient operational state in which the operating state of the engine frequently changes. In this transient operational state, it is difficult to correct the amount of fuel necessary for raising temperature obtained from the map data according to the changes in engine operating conditions, and it is not possible to follow up the changes in the engine operating conditions.

Consequently, the problem exists that the calculated amount of fuel necessary for raising temperature becomes a value that deviates from the amount of fuel actually required for raising temperature, maintaining the temperature of the NOx occlusion reduction type catalyst in the temperature region where desulfurization is possible, becomes problematic, the temperature of the NOx occlusion reduction type catalyst does not rise and desulfurization does not proceed, or on the other hand the problem is created in which the temperature rises too much and the NOx occlusion reduction type catalyst is thermally deteriorated.

Figure 5:
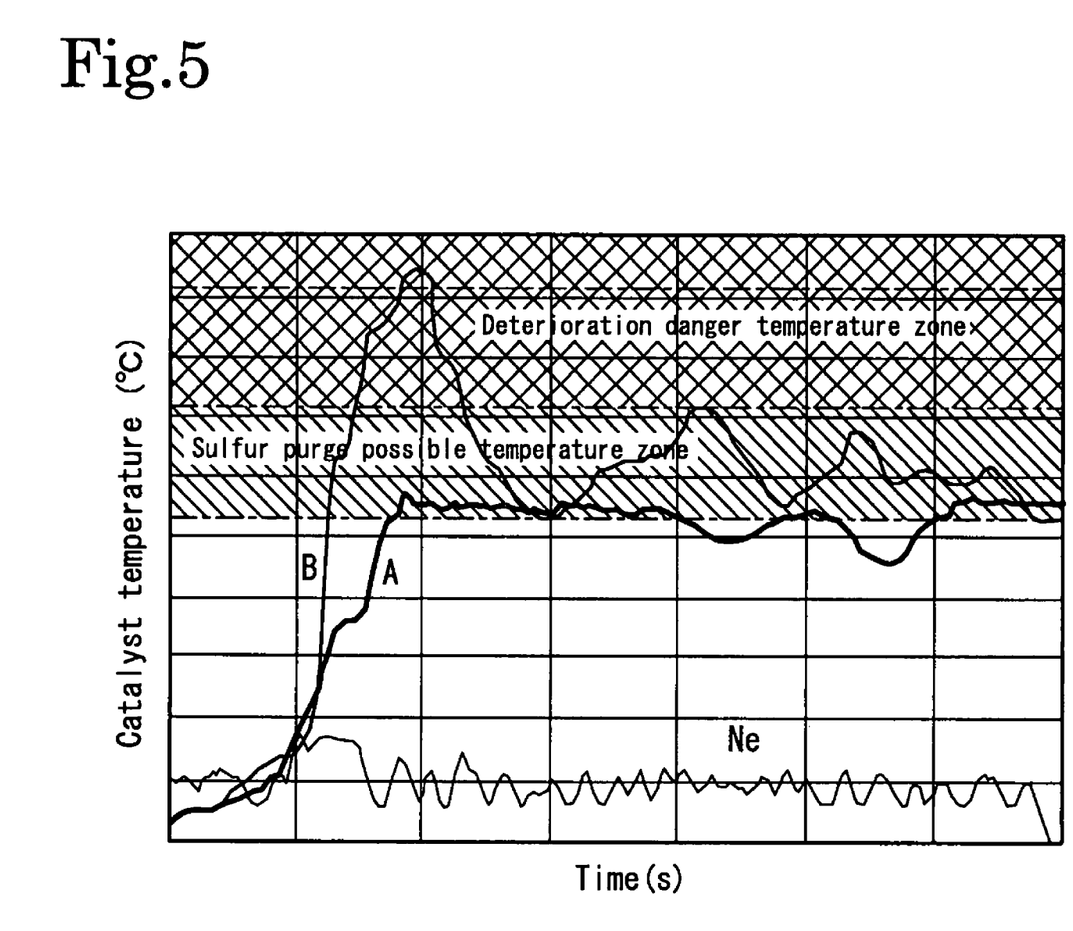
FIG. 5 is a diagram showing the change in the catalyst temperature when conducting desulfurization control of the second embodiment according to the present invention and the change in the catalyst temperature when conducting desulfurization control with conventional technology.

The solid line B in FIG. 5 shows this state. This line B shows the change in the catalyst temperature of the NOx occlusion reduction type catalyst when desulfurization control (sulfur purge control) is conducted with map control in conventional technology, in transient operation cold start mode. In this map control, the temperature rises rapidly but overshoots, and it becomes a higher temperature than the region where sulfur purge is possible, and then it enters into the dangerous temperature region of thermal deterioration. Furthermore, even after the temperature has risen, because the up and down motion of the catalyst temperature is very large, the temperature deviates from the temperature region in which sulfur purge is possible and easily enters into the dangerous temperature region of thermal degradation.

Patent document 1: Japanese Patent Application Kohyo Publication 2003-500594
Patent document 2: Japanese Patent Application Kokai Publication No. 2003-336518
Patent document 3: Japanese Patent Application Kokai Publication No. 2004-92445
Patent document 4: Japanese Patent Application Kokai Publication No. 2000-54900

SUMMARY OF THE INVENTION

The present invention is designed to resolve the above-mentioned problems and, in an exhaust gas purification system includes a NOx conversion catalyst device with a NOx conversion catalyst for purifying NOx in exhaust gas, its objective is to provide a desulfurization control method for an exhaust gas purification system and an exhaust gas purification system that can introduce with excellent precision a required and sufficient amount of fuel for raising temperature in order to reach the desulfurization target temperature and to maintain a state at or above the desulfurization target temperature even in a transient operational state. It is carried out by setting the amount of fuel for raising temperature required to raise the temperature of the NOx conversion catalyst to the desulfurization target temperature, using the heat quantity calculated from a first heat quantity required to raise the temperature of the NOx conversion catalyst device and a second heat quantity required to raise the temperature of the exhaust gas without any calculations from existing map data, at desulfurization control time.

The desulfurization control method for the exhaust gas purification system for achieving the above-stated objective is characterized by the following. In the exhaust gas purification system having a NOx conversion catalyst device with a NOx conversion catalyst that purifies the NOx in the engine exhaust gas of an engine, this method includes the step of carrying out desulfurization control in order to recover from deterioration due to sulfur poisoning of the NOx conversion catalyst, the desulfurization control method for the exhaust gas purification system sets the amount of fuel for raising temperature required to raise a first detection temperature indicating the temperature of the catalyst in the NOx conversion catalyst device to the desulfurization target temperature, by using the heat quantity calculated from a first heat quantity required to raise the temperature of the NOx conversion catalyst device and from a second heat quantity required to raise the temperature of the exhaust gas, during desulfurization control.

That is, in an exhaust gas purification system including a NOx conversion catalyst device with a NOx catalyst, in controlling the engine at desulfurization control time, the amount of fuel for raising temperature, which is used for post injection etc., required for the catalyst temperature of the NOx conversion catalyst device to reach a desulfurization target temperature and to be maintained at the desulfurization target temperature, is calculated from the heat quantity for raising the temperature of the NOx conversion catalyst and the exhaust gas, with no calculation from map data set beforehand.

This NOx conversion catalyst includes a NOx occlusion reduction type catalyst such that NOx is occluded when the air/fuel ratio of the exhaust gas is in a lean state, and the occluded NOx is released and reduced when the air/fuel ratio of the exhaust gas is in a rich state. However, here in a broader sense, this refers to a NOx conversion catalyst which is recovered from the sulfur poisoning through releasing the sulfur part, when the catalyst temperature is at a higher temperature than that during a normal engine operation state.

The amount of fuel for raising temperature at the time of desulfurization control is the amount of fuel required to raise the temperature of the exhaust gas and the NOx conversion catalyst for desulfurization of the NOx conversion catalyst, through fuel injection control in the cylinders, for example, post injection or through direct fuel injection control in the exhaust pipe, and is the amount of independently added fuel for raising temperature separately from the amount of fuel to produce engine torque output. This fuel for raising temperature is combusted in the cylinders or in the exhaust passage (exhaust manifold, exhaust pipe), and contributes to the raise the temperature of the exhaust gas. And the fuel is provided as unburned fuel in the exhaust gas where it is oxidized, for example, through the oxidation catalyst device placed upstream of the NOx conversion catalyst and contributes to the raise the temperature of the exhaust gas. By this rise of the temperature of the exhaust gas, the temperature of the NOx conversion catalyst is raised and maintained above the desulfurization target temperature.

The first detection temperature is the temperature detected when it is possible to directly detect the temperature of the catalyst of the NOx conversion catalyst device. However, because it is usually difficult to directly measure the temperature of the catalyst, it is estimated from the detected temperature of the exhaust gas flowing into the NOx conversion catalyst device, or, it is estimated from the detected temperature of the exhaust gas flowing out to the NOx conversion catalyst device, or, it is estimated from the detected temperature of the exhaust gas in front of and behind the NOx conversion catalyst device. As a result, these catalyst temperatures of the NOx conversion catalyst device estimated and obtained, this way, are considered here to be the first detection temperature.

The desulfurization target temperature refers to the temperature during desulfurization control at which, desulfurization (sulfur purge) is effectively carried out when the first detection temperature of the NOx conversion catalyst is at or above this temperature, and this temperature is normally set to a predetermined temperature in the range of 600° C. to 700° C.

According to this structure, even during transient operation, it is possible to precisely put in a necessary and sufficient amount of fuel for raising temperature which is required to increase the temperature of the catalyst to the desulfurization target temperature and to maintain it at or above the desulfurization target temperature, without calculating a correction amount and revising the amount of fuel calculated from map data using the correction amount.

In the desulfurization control method for an exhaust gas purification system described above, a first heat quantity is calculated by multiplying the difference between the desulfurization target temperature and the first detection temperature by the heat capacity of the NOx conversion catalyst device. A second heat quantity is calculated by multiplying the difference between the desulfurization target temperature and the detection temperature of the exhaust gas flowing into the NOx conversion catalyst device by the heat capacity of the exhaust gas. The heat quantity for raising temperature is calculated by adding the first heat quantity, the second heat quantity and a third heat quantity radiating from the exhaust gas purification system. The amount of fuel for raising temperature is calculated by dividing the heat quantity for raising temperature by the low calorific value of fuel.

That is, the heat quantity needed to raise the first detection temperature of the NOx conversion catalyst device from the current temperature to the desulfurization target temperature is considered to be the first heat quantity. Additionally, the heat quantity needed to raise the temperature of the exhaust gas from the current detection temperature of the exhaust to the desulfurization target temperature is considered to be the second heat quantity. The heat quantity corresponding to the sum of the first heat quantity, the second heat quantity and the heat quantity lost in the exhaust gas purification system is considered to be the heat quantity necessary to be generated for raising temperature. With this heat quantity for raising temperature being the heat quantity that is generated by the fuel in the amount of fuel used to raise temperature, by dividing the heat quantity for raising temperature by the low calorific value (net calorific value) of fuel, the required amount of fuel for raising temperature is found.

Furthermore, with regard to the heat exchange accompanying the NOx reduction reaction in the NOx conversion catalyst, because the heat quantity is negligible compared to the heat required to raise the temperature of the NOx conversion catalyst and the exhaust gas, it can be ignored. In addition, the heat exchange accompanying this NOx reduction reaction can be handled by including it in the heat quantity released from the catalyst device or the pipes determined in bench testing.

Furthermore, in the desulfurization method for the above described exhaust gas purification system, the heat capacity of the exhaust gas is calculated by multiplying the specific heat of the exhaust gas by the sum of the amount of flow of the exhaust gas calculated from the amount of air intake and the amount of fuel injection. That is, the amount of flow of the exhaust gas is considered to be the sum of the amount of air intake and the amount of fuel injection. The value is calculated by multiplying the specific heat of the exhaust gas by this sum, is considered to be the heat capacity of the exhaust gas. However, the specific heat of the exhaust gas varies somewhat depending on the ratio of the amount of air intake and the amount of fuel injection and on the temperature. As a result, in accordance with the calculation precision demanded, the ratio of the amount of air intake and the amount of fuel injection and the temperature are taken into consideration when setting up and calculating the specific heat of the exhaust gas.

Additionally, in the desulfurization control method for the above described exhaust gas purification system, if the oxidation catalyst device is positioned on the upstream side of the NOx conversion catalyst device, when calculating the amount of fuel for raising temperature, a fourth heat quantity is added to the heat quantity for raising temperature, calculated by multiplying the difference between the desulfurization target temperature and the second detection temperature indicating the catalyst temperature of the oxidation catalyst device by the heat capacity of the oxidation catalyst device.

When the catalyst temperature of the oxidation catalyst device can be detected directly, the second detection temperature is this detected temperature. However, because normally it is difficult to measure the catalyst temperature directly, it is estimated from the detection temperature of the exhaust gas flowing into the oxidation catalyst device, from the detection temperature of the exhaust gas flowing out of the oxidation catalyst device and from the detection temperature of the exhaust gas in front of and behind the oxidation catalyst device. Consequently, the catalyst temperature of the oxidation catalyst device obtained from these estimations is considered here to be the second detection temperature.

According to this structure, it is possible to calculate both of the heat quantity for raising temperature that includes the heat quantity necessary to raise the temperature of the oxidation catalyst device, and the amount of fuel for raising temperature. Furthermore, if the heat quantity released changes by having an oxidation catalyst device set up, this amount of change is added to the third heat quantity that denotes the heat released from the exhaust gas purification system.

An exhaust gas purification system for achieving the above-mentioned objectives includes a NOx conversion catalyst device with a NOx conversion catalyst which purifies the NOx in the exhaust gas of an engine. In the exhaust gas purification system including a control device that carries out desulfurization control to recover the deterioration from sulfur poisoning of the NOx conversion catalyst, the control device is so structured as to set the amount of fuel for raising temperature required to raise the first detection temperature indicating the temperature of the catalyst in the NOx conversion catalyst device to the desulfurization target temperature by using the heat quantity calculated from a first heat quantity for raising the temperature of the NOx conversion catalyst device and a second heat quantity for raising the temperature of the exhaust gas.

Furthermore, in the above described exhaust gas purification system, the control device is so structured as to calculate the amount of fuel for raising temperature by calculating the first heat quantity by multiplying the difference between the desulfurization target temperature and the first detection temperature by the heat capacity of the NOx conversion catalyst device, calculating the second heat quantity by multiplying the difference between the desulfurization target temperature and the detection temperature of the exhaust gas flowing into the NOx conversion catalyst device by the heat capacity of the exhaust gas, calculating the heat quantity for raising temperature by adding the first heat quantity, the second heat quantity and a third heat quantity released from the exhaust gas purification system and calculating the amount of fuel for raising temperature by dividing the heat quantity for raising temperature by the low calorific value of the fuel.

Furthermore, in the above described exhaust gas purification system, the control system is structured to calculate the heat capacity of the exhaust gas by multiplying the specific heat of the exhaust gas by the sum of the flow amount of the exhaust gas calculated from the amount of air intake and the amount of fuel injection.

Additionally, in the above described exhaust gas purification system, if the oxidation catalyst device upstream of the NOx conversion catalyst device has been set up, when calculating the amount of fuel for raising temperature, the control device is structured so that a fourth heat quantity, which is calculated by multiplying the difference between the desulfurization target temperature and the second detection temperature indicating the temperature of the catalyst of the oxidation catalyst device by the heat capacity of the oxidation catalyst device, is added to the heat quantity for raising temperature.

According to the exhaust gas purification system with the above described structure, it is possible to realize a desulfurization control method for the exhaust gas purification system and to obtain the same operational results with this desulfurization control method.

According to the desulfurization control method in the exhaust gas purification method and the exhaust gas purification system according to the present invention, in the exhaust gas purification system including a NOx conversion catalyst device with a NOx conversion catalyst for purifying the NOx in the exhaust gas, at desulfurization control time, by setting the amount of fuel for raising temperature required to raise the temperature of the NOx conversion catalyst to the target temperature, the amount of fuel calculated from the first heat quantity required to raise the temperature of the NOx conversion catalyst device and the second heat quantity required to raise the temperature of the exhaust gas, without calculating from previously prepared map data, it is possible with excellent precision to put in a required and sufficient amount of fuel for raising temperature in order to reach the desulfurization target temperature and to maintain a state at or above the desulfurization target temperature, even during transient operation.

DETAILED DESCRIPTION OF THE EMBODIMENTS

The desulfurization control method for the exhaust gas purification method and the exhaust gas purification system of the embodiments according to the present invention will be described referencing the figures and using a NOx occlusion reduction type catalyst as the NOx conversion catalyst. Furthermore, the exhaust gas rich state referred to here does not necessarily mean a rich combustion in the cylinders but refers to the fact that the ratio of the amount of air provided in the exhaust gas flowing into the NOx occlusion reduction type catalyst and the amount of fuel (includes the combusted portion in the cylinders) is in a state close to the theoretical air/fuel ratio or in a rich state in which the amount of fuel is more than the theoretical air/fuel ratio.

Figure 1:
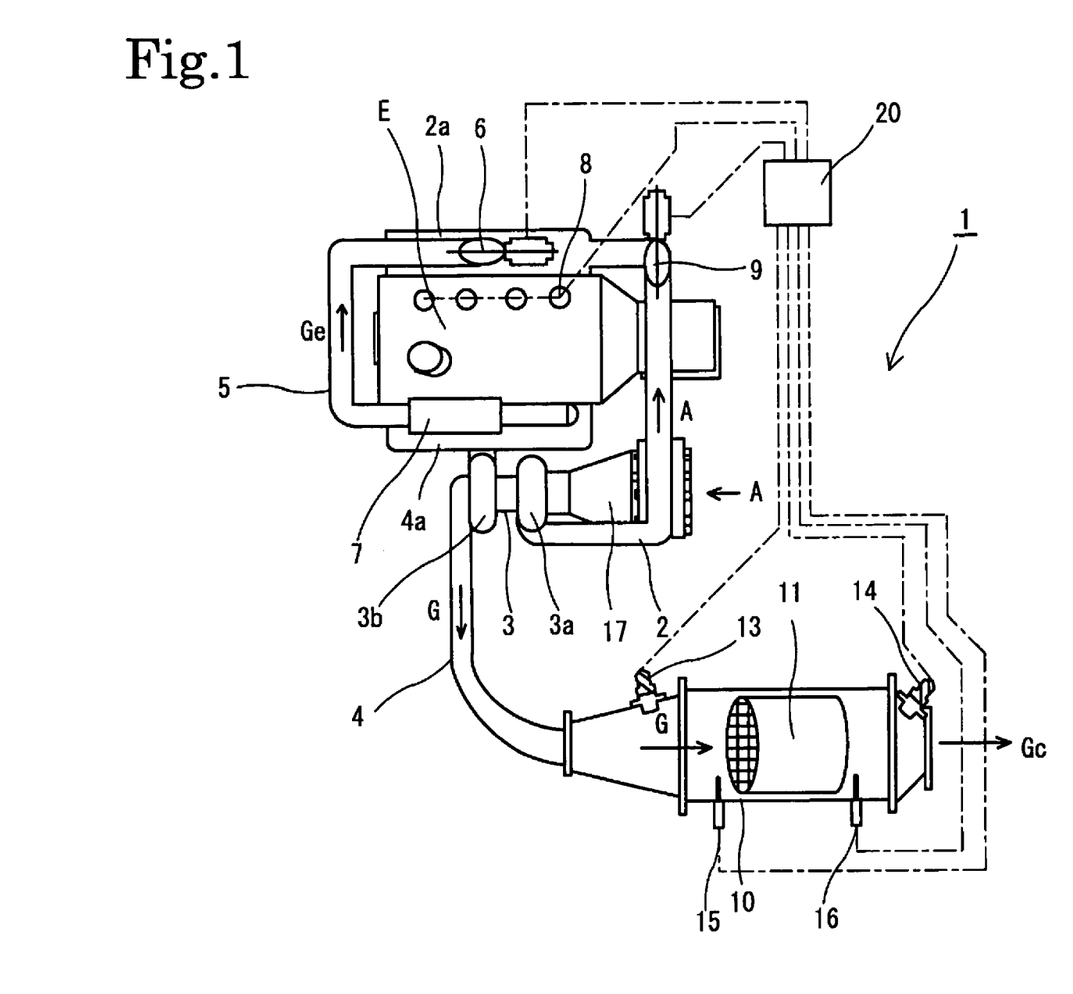
FIG. 1 is a diagram showing the structure of the first embodiment of the exhaust gas purification system according to the present invention.

FIG. 1 shows the structure of the exhaust gas purification system 1 of an embodiment according to the present invention. In this exhaust gas purification system 1, the exhaust gas purification device 10 including a NOx conversion catalyst device 11 carrying a NOx occlusion reduction type catalyst, is positioned in the exhaust passage 4 of the engine E (internal combustion engine).

This NOx conversion catalyst device 11 is formed as a monolith catalyst. A catalytic coat layer on a carrier such as aluminum oxide or titanium oxide is set up on this monolith catalyst and a catalytic metal such as platinum (Pt) or palladium (Pd) and a NOx occlusion body (NOx occlusion material) such as barium (Ba) is supported on this catalyst coat layer.

With this NOx conversion catalyst device 11, in an exhaust gas state where the oxygen concentration is high (rich air/fuel ratio state), the NOx in the exhaust gas is purified through occlusion of the NOx in the exhaust gas by the NOx occlusion material. Furthermore, when in an exhaust gas state in which the oxygen concentration is either low or zero, the occluded NOx is released and the released NOx is reduced by the catalytic action of the catalyst metal. In this manner, the release of NOx into the atmosphere is prevented.

The $\lambda$ sensors (excess air ratio sensors) 13 and 14 are placed respectively on the upstream side and the downstream side of the NOx conversion catalyst device 11. Because the $\lambda$ sensor 13 on the upstream side is used for air/fuel control for rich control, a sensor is used which can measure the value of the excess air ratio (oxygen concentration). Conversely, for the $\lambda$ sensor 14 on the downstream side, a binary sensor is used having output characteristics in which the values close to the stoichiometric air/fuel ratio change abruptly. From the output of this $\lambda$ sensor 14, it is verified that the state inside the catalyst changes into the reduction area and that the elimination of the sulfur is surely being carried out.

Furthermore, in order to measure the temperature of the NOx conversion catalyst device 11, the upstream temperature sensor 15 is placed on the upstream side (front side) of the NOx conversion catalyst device 11. Additionally, the downstream temperature sensor 16 is positioned on the downstream side (rear side). The average temperature of the temperature sensors 15 and 16 placed in these two locations is considered to be the first detection temperature Tc1. This first detection temperature Tc1 is closely related to the catalyst temperature of the NOx conversion catalyst device 11 and is the temperature that replaces this catalyst temperature, that is, it is the temperature that indicates the temperature of the catalyst.

A control device 20 (ECU: engine control unit) is installed which in addition to performing the general control of the operations of the engine E also controls the recovery of the NOx purification capability of the NOx conversion catalyst device 11. The detection values from the $\lambda$ sensor 14, the upstream temperature sensor 15 and the downstream temperature sensor 16 and the like are input into this control unit 20. Furthermore, signals are output from this control unit 20 which control the EGR valve 6, the fuel injection valves 8 of the common rail electrically controlled fuel injection device used for fuel injection and the intake throttle valve 9 in the engine E.

In this exhaust gas purification system 1, the air A passes through the mass airflow sensor 17 (MAF sensor) in the air intake passage 2 and the compressor 3a of the turbocharger 3. Subsequently, the amount of the air A is adjusted by the intake throttle valve 9 and enters into the cylinders from the intake manifold 2a. The exhaust gas G generated in the cylinders goes into the exhaust passage 4 from the exhaust manifold 4a and drives the turbine 3b of the turbocharger 3. Then, the exhaust gas G passes through the exhaust gas purification device 10 and becomes the purified exhaust gas Gc. This purified exhaust gas Gc passes through a muffler (not shown in the figure) and is released into the atmosphere. Furthermore, part of the exhaust gas G passes through the EGR cooler 7 of the EGR passage 5 as the EGR gas Ge and it is re-circulated into the intake manifold 2a after its quantity is adjusted by the EGR valve 6.

The control device of the exhaust gas purification system 1 is embedded in the control device 20 of the engine E, and carries out the control of the exhaust gas purification system 1 in parallel with the operational control of the engine E. This control device for the exhaust gas purification system 1 carries out the control of the exhaust gas purification system including the control for NOx regeneration and the control for desulfurization of the NOx conversion catalyst device 11.

In the control for NOx regeneration, the amount of exhaust of the NOx per unit time $\Delta NOx$ is calculated from the operational state of the engine E and when the NOx accumulated value ΣNOx from the accumulated calculation of ΔNOx exceeds a predetermined judgment value Cn, this determines that the regeneration is begun. Or, the NOx purification rate is calculated from the NOx concentrations at upstream and downstream of the NOx conversion catalyst device 11 and if this NOx purification rate becomes lower than a predetermined judgment value, it is determined that the regeneration for the NOx catalyst is begun.

In the NOx regeneration control, intake-system rich control and fuel-system rich control are used together and the exhaust gas air/fuel ratio is controlled in a stoichiometric air/fuel ratio (theoretical air/fuel ratio) or in a rich state. In the intake-system rich control, the EGR amount is increased by controlling the EGR valve 6, the amount of fresh air intake is reduced through controlling the intake throttle valve 9, and the air/fuel ratio of the exhaust gas is lowered. Furthermore, in the fuel-system rich control, in addition to intake-system rich control, fuel is added to the exhaust gas by controlling the fuel injection, such as post injection, in the cylinders, and the air/fuel ratio is lowered. Through these controls, in addition to putting the state of the exhaust gas into a predetermined air/fuel ratio state (depends also on the catalyst but with conversion of the excess air rate, roughly 0.8 to 1.0), it is put in a predetermined temperature range (depends on the catalyst but roughly 200° C. to 600° C.). In this manner, the NOx occlusion capability, namely, the NOx purification capability, is recovered and regeneration of the NOx catalyst is carried out. Furthermore, because the present invention pertains to desulfurization control of the NOx conversion catalyst device 11, it is possible to use conventional technology in the NOx regeneration control in order to recover the NOx occlusion capability so that a detailed explanation regarding NOx regeneration control is here omitted.

Conversely, in the desulfurization control, through a method of adding up the accumulated amount of sulfur or the other method, it is determined whether or not the sulfur has accumulated to a point where the NOx occlusion capability is reduced and whether or not to begin sulfur purge control. That is, desulfurization begins when the amount of accumulated sulfur is at or above a predetermined value. In the desulfurization control, by both the intake-system control such as EGR control and/or intake throttle control, and the fuel-system control, such as through post injection, in addition to raising the first detection temperature Tc1 of the NOx conversion catalyst device 11 to the target temperature Tsp used for desulfurization where sulfur can be decomposed, the air/fuel ratio of the exhaust gas is controlled. In this manner, desulfurization is effectively carried out.

The desulfurization target temperature Tsp normally is set to a temperature between 600° C. and 700° C. Additionally, in the air/fuel ratio rich control used for desulfurization, the air/fuel ratio of the exhaust gas flowing into the NOx conversion catalyst device 11 is maintained at a predetermined excess air rate of on the order of 0.9 by excess air ratio conversion. In this air/fuel ratio rich control, there are also times when control is exerted to maintain the air excess rate at a predetermined air excess rate by carrying out continuous rich control. Furthermore, by repeating rich control and lean control, there are also times when control can be exerted by maintaining the air excess rate on average at a predetermined air excess rate. Additionally, the air/fuel ratio rich control used for this desulfurization can be carried out until the desulfurization of the NOx occlusion reduction type catalyst of the NOx conversion catalyst device 11 is completed and the performance deterioration from sulfur poisoning is recovered. This desulfurization takes approximately 30 minutes to 40 minutes.

Figure 2:
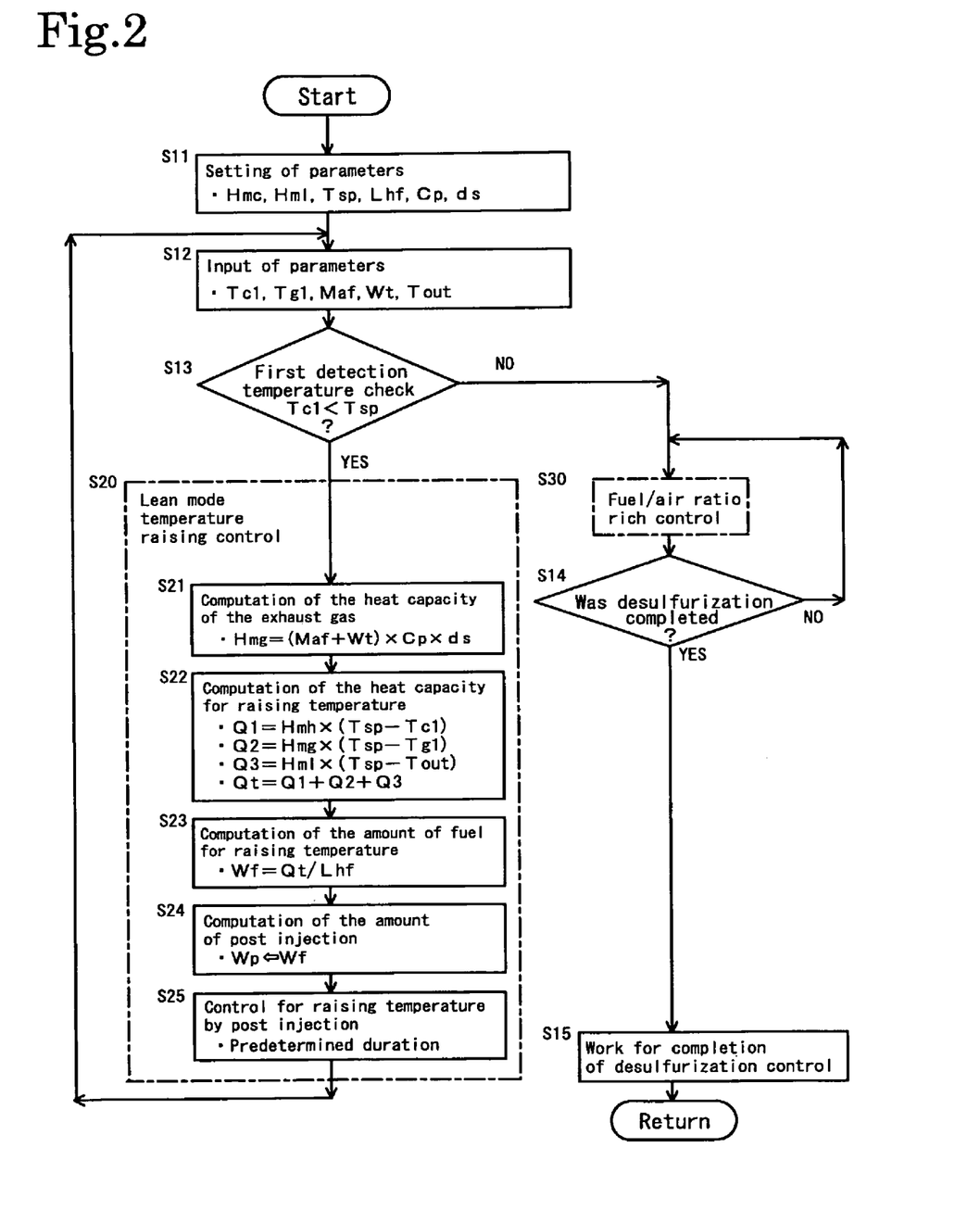
FIG. 2 is a diagram showing an example of the desulfurization control flow of the first embodiment according to the present invention.

In this exhaust gas purification system 1, desulfurization control for the NOx conversion catalyst device 11 is carried out by the control device in the exhaust gas purification system 1 included in the control device 20 of the engine E in accordance with the desulfurization control flow as shown in FIG. 2. Furthermore, the desulfurization control flow in FIG. 2 is shown to be called and carried out from this control flow when the engine E is operating and when desulfurization control is determined to be necessary by the control flow of the exhaust gas purification system being carried out in parallel with other control flows of the engine E.

FIG. 2 shows the desulfurization control flow in the desulfurization control of the present invention. This desulfurization control flow indicates the calculation flow and calculation logic for the amount of fuel for raising temperature, for example, fuel for post injection in order to raise and maintain the temperature of the NOx conversion catalyst device 11.

When this desulfurization control flow begins, the heat capacity Hmc (J/deg) of the catalyst, the amount Hml (J/deg) related to the heat released from the exhaust gas purification system 1 of the NOx conversion catalyst device 11 and the pipes and the like, the desulfurization target temperature Tsp (° C.), the low calorific value of the light gas oil Lhf (J/g), the specific heat Cp (J/g) and the unit time ds (s) used for calculations, are read to be set up with the parameters set up in step S11.

In the next step S12, the first detection temperature Tc1 (° C.), the detection temperature Tg1 of the exhaust gas flowing into the NOx conversion catalyst 11, the amount of air intake Maf (g/s), the amount of fuel injection Wt (g/s) and the outside air temperature Tout, at the current moment (control time), are input.

In the next step S13, it is determined whether the first detection temperature Tc1 (° C.) is or is not less than the desulfurization target temperature Tsp (t). When it is determined that the first detection temperature Tc1 (° C.) is less than the desulfurization target temperature Tsp (° C.), the lean mode temperature raising control of step S20 is carried out and when above, the air/fuel ratio rich control of step S30 is carried out.

In the lean mode temperature rise control of step S20, the amount of fuel for raising temperature is calculated as shown below. The amount of fuel injection for post injection or the like is calculated and during the predetermined first time (the time related to the check interval of the first detection temperature), temperature rise control is carried out by post injection or the like. To start, in the calculation of the heat capacity of step S21 the heat capacity Hmg of the exhaust gas is calculated by $Hmg=(Maf+Wt) \times Cp \times ds$.

Next, for calculating the total heat quantity required for raising temperature of step S22, the first heat quantity Q1 necessary for raising the temperature of the NOx conversion catalyst device 11 is $Q1=Hmh \times (Tsp-Tc1)$, the second heat quantity Q2 required to raise the temperature of the exhaust gas Q2 is $Q2=Hmg \times (Tsp-Tg1)$ and the third heat quantity Q3 released from the exhaust gas purification system Q3 is $Q3=Hml \times (Tsp-Tout)$. And the amount of these heat for raising temperature is calculated as the sum of heat quantity for raising temperature $Qt=Q1+Q2+Q3$.

In these heat quantity calculations, because the heat capacity Hmc of the NOx conversion catalyst device 11 does not change, its value input beforehand is used as a fixed value. Conversely, the heat capacity Hmg of the exhaust gas is determined from the flow amount Wg of the exhaust gas determined by the amount of air intake Maf (amount of fresh air) and the fuel injection amount Wt, and the specific heat Cp. The first heat quantity Q1 is calculated by multiplying the difference between the desulfurization target temperature Tsp and the first detection temperature Tc1 by the heat capacity Hmc of the NOx conversion catalyst device 11. Furthermore, the second heat quantity Q2 is calculated by multiplying the difference between the desulfurization target temperature Tsp and the detection temperature Tg1 of the exhaust gas flowing into the NOx conversion catalyst device by the heat capacity Hmg of the exhaust gas.

Additionally, the third heat quantity Q3 released from the exhaust gas purification system 1 is calculated by using the amount Hml related to the heat released from the exhaust gas purification system 1 which is calculated from the amount of the released heat determined from bench tests conducted beforehand. This Hml takes the first detection temperature Tout as its basis and Q3 is calculated by Q3=Hml×(Tsp−Tout). This heat quantity released Q3 is not necessarily proportional to (Tsp−Tout) because there is some radiant heat transfer in addition to conductive heat transfer and convective heat transfer. However, here it is treated as being nearly proportional. Consequently, in order to increase the precision of Q3, a different calculation method may be used. Thus, the heat quantity Qt used for raising temperature is calculated by adding together the first heat quantity Q1, the second heat quantity Q2 and the third heat quantity Q3.

In the calculation of the amount of fuel (weight) used for raising temperature in the next step S23, the amount of fuel Wf necessary for raising temperature is calculated by Wf=Qt/Lhf. In the next step S24, the amount of post fuel injection Wp is calculated from the amount of fuel Wf for raising temperature. The amount of post injection fuel Wp is set by taking into consideration the first detection temperature Tc1, the detection temperature Tg1 of the exhaust gas, the time taken for raising temperature, the air/fuel ratio (excess air rate) and others.

In the next step S25, post injection is carried out during a predetermined first time with this amount of post injection fuel Wp, and the temperature raising of the exhaust gas and the NOx conversion catalyst device 11 is conducted and the process returns to step S12. Fuel-system control of the post injection or the like, and the intake-system control with the intake throttle and/or the EGR valve 6 and/or the like, are used together as the catalyst temperature rise method of step 25 and depending on requirements, other methods are also used. Steps S12 to S20 are repeated and when the first detection temperature Tc1 (° C.) is at or above the desulfurization target temperature Tsp (° C.), the process goes to step S30.

In the air/fuel ratio rich control of step S30, the air intake throttle, EGR control and/or post injection are carried out for this air/fuel ratio rich control so that the air excess rate detected by the λ sensor 13 becomes a predetermined air excess rate of on the order of 0.9. Furthermore, there are times when continuously rich control is carried out but there are also times when control is carried out by alternate repetitions of short time (e.g. 4 s) rich control and short time (e.g. 3 s) lean control. Because of this repetition, desulfurization occurs while generation of $H_2S$ (hydrogen sulfide) is suppressed. This air/fuel ratio rich control is conducted a predetermined second time (the time related to the interval to check the completion of desulfurization) or when repeating the rich control and lean control is conducted a predetermined number of cycles and then the process goes to step S14.

In step S14, it is determined whether or not desulfurization has been completed. In this determination, referencing the map data which is recorded in the ECU beforehand from previous testing and in which the amount of sulfur eliminated SP1 is recorded based on the engine speed and the catalyst temperature, the amount of sulfur eliminated SP1 is calculated from the engine speed and the catalyst temperature (first detection temperature) Tc1 measured in the rich air/fuel ratio control of step S30. This sulfur elimination amount SP1 accumulates with each rich air/fuel ratio control of step S30 leading to the calculation of the amount of purged sulfur ΣSP1. Verification is made of the completion of sulfur release depending on whether or not this amount of purged sulfur ΣSP1 exceeds the determination quantity SPc used for completion which is related to the sulfur accumulation amount ΣSP0 when determining the beginning of desulfurization. When the amount of purged sulfur ΣSP1 in this verification exceeds the determination quantity SPc used for completion, desulfurization is considered to be complete. When it does not exceed, the rich air/fuel ratio control continues and the process returns to step S30.

When desulfurization is completed in step S14, the process moves to the work for completion of desulfurization control of step S15 when desulfurization control operations are completed and the process goes to return. When returning, the return is made to the control flow of the exhaust gas purification system but depending on the determination to start desulfurization control, the desulfurization control flow of FIG. 2 is started again and repeated until the engine stops. Furthermore, when the engine key is OFF during the control, it is not shown in the diagrams but an interruption occurs. After the completion process (not shown in the diagram) required in the various steps in which this interruption occurs is carried out, the process goes to return. By means of this return, this desulfurization control flow is also completed in addition to completion of the control of the exhaust gas purification system and the control of the engine.

According to the exhaust gas purification system 1 and the desulfurization control method for the exhaust gas purification system of the first embodiment, even during transient operation mode, it is possible to calculate the most appropriate amount of fuel Wf necessary for raising temperature through successive calculations and it is possible to maintain in a stable manner the first detection temperature Tc1 indicating the catalyst temperature of the NOx occlusion reduction type catalyst of the NOx conversion catalyst device 11, at or above the desulfurization target temperature Tsp.

Figure 3:
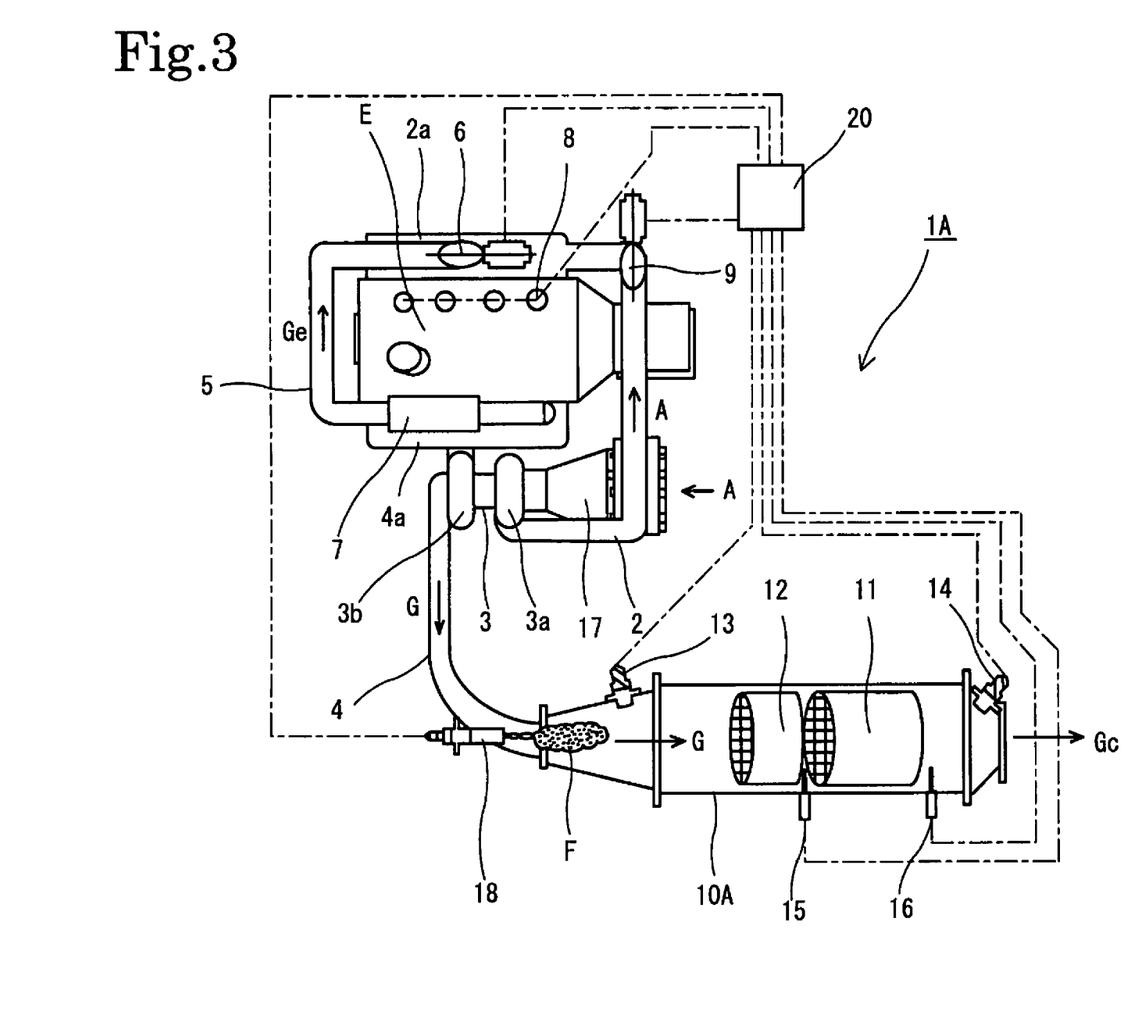
FIG. 3 is a diagram showing the structure of the second embodiment of the exhaust gas purification system according to the present invention.

Next, the second embodiment will be explained. As shown in FIG. 3, the exhaust gas purification device 10A in the exhaust gas purification system 1A of this second embodiment is formed having an oxidation catalyst device 12 on the upstream side and a NOx conversion catalyst device 11 on the down stream side. This oxidation catalyst device 12 is formed carrying an oxidation catalyst such as platinum (Pt) on a supporting body such as a porous ceramic honeycombed structure.

Furthermore, when conducting the control for direct fuel injection in the exhaust pipe, an HC supply valve 18 to provide the hydrocarbon (HC) F is installed in the exhaust passage 4 on the upstream side of the NOx conversion catalyst device 11. With this HC supply valve 18, the hydrocarbon F such as light oil as engine fuel from the fuel tank (not shown in the figure), is injected directly into the exhaust passage 4, this injected hydrocarbon is oxidized through the oxidation catalyst device 12 and the air/fuel ratio of the exhaust gas G is made lean, rich or in a stoichiometric state (theoretical air/fuel ratio state). This HC supply valve 18 becomes the means for the fuel-system rich control. Furthermore, when similar air/fuel ratio control is carried out by post injection in the fuel injection into the cylinders of the engine E, positioning of this HC supply valve 18 may be omitted. Furthermore, the structure of the exhaust gas purification system is the same as the exhaust gas purification system 1 of the first embodiment excluding the oxidation catalyst device 12 and the HC supply valve 18.

Figure 4:
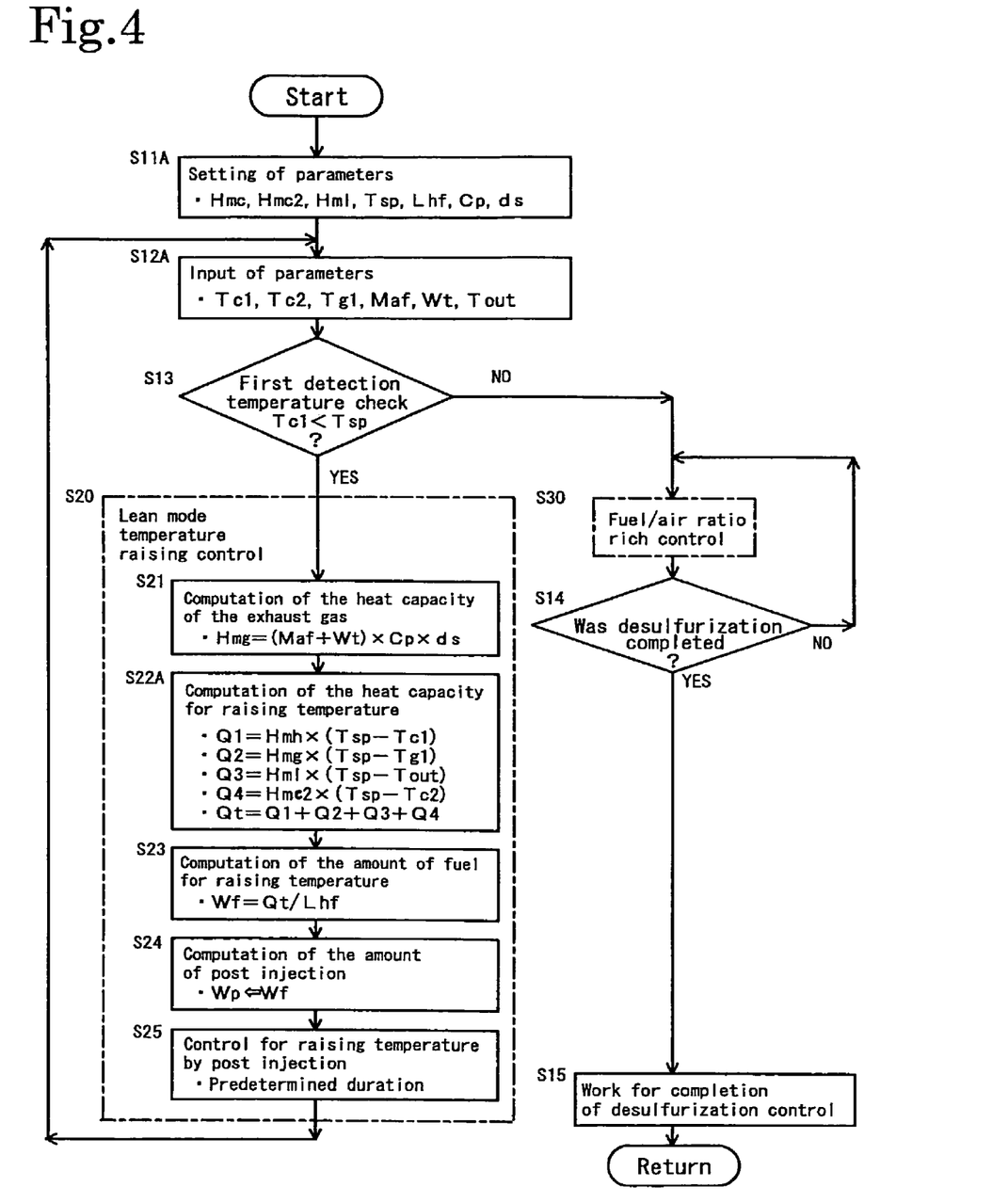
FIG. 4 is a diagram showing an example of the desulfurization control flow of the second embodiment according to the present invention.

Additionally, FIG. 4 shows the desulfurization control flow but the desulfurization control flow steps S11, S12 and S22 (FIG. 2) of the first embodiment become the steps S11A, S12A and S22A. In step S11A the parameters are set up and the heat capacity Hmc of the oxidation catalyst device 12 is added, while in step S12A the second detection temperature Tc2 indicating the catalyst temperature of the oxidation catalyst device 12 is added in the process of inputting parameters. This second detection temperature Tc2 is closely related to the catalyst temperature of the oxidation catalyst device 12 and is the temperature replacing the catalyst temperature, namely, it is the temperature that indicates the temperature of the catalyst. Here, the detection temperature Tc2 of the exhaust gas flowing from the oxidation catalyst device 12 is considered to be the second detection temperature. Namely, the temperature of the exhaust gas detected by the temperature sensor 15 is adopted. Furthermore, this exhaust gas temperature may be used as is, but when a difference with the catalyst temperature is known beforehand from previous experiments, it is preferable to correct this difference.

In step S22A, when calculating the fuel quantity Qt for raising temperature, the point of difference is that the fourth heat quantity Q4 calculated by multiplying the difference between the desulfurization target temperature Tsp and the second detection temperature Tc2 by the heat capacity Hmc2 of the oxidation catalyst device 12 is added. The fourth heat quantity Q4 is calculated by Q4=Hmc2×(Tsp−Tc2) and the amount of fuel for raising temperature Qt is calculated from Qt=Q1+Q2+Q3+Q4. Furthermore, when the heat quantity released from the exhaust gas purification system 1A changes by installing the oxidation catalyst device 12, this heat change is added to the third heat quantity Q3 that indicates the heat release of the exhaust gas purification system 1A.

According to the control flow in FIG. 4, when calculating the amount of fuel Wf necessary for raising temperature, it is possible to add a fourth heat quantity Q4 to the heat quantity Qt necessary for raising temperature. This fourth heat quantity Q4 is calculated by multiplying the difference between the desulfurization target temperature Tsp and the second detection temperature Tc2 indicating the temperature of the catalyst in the oxidation catalyst device 12, by the heat quantity Hmc2 of the oxidation catalyst device 12.

According to the exhaust gas purification system 1A and the desulfurization control method for the exhaust gas purification system of this second embodiment, even when the oxidation catalyst device 12 is placed upstream of the NOx conversion catalyst device 11, in transient operation mode, it is possible to calculate the optimum quantity of fuel Wf for raising temperature through successive calculations and to maintain in a stable manner the first detection temperature Tc1 indicating the temperature of the catalyst of the NOx occlusion reduction type catalyst of the NOx conversion catalyst device 11 at or above the desulfurization target temperature Tsp.

FIG. 5 shows a comparison between the changes (solid line A) in the catalyst temperature of the NOx conversion catalyst device 11 when carrying out desulfurization control in the second embodiment and the changes (solid line B) in the catalyst temperature when carrying out normal map control, in transient operation cold start mode. The horizontal axis indicates the passage of time and the vertical axis indicates the engine speed Ne and the catalyst temperature (A, B).

As can be seen from FIG. 5, the normal map control line B has a rapid increase in temperature and quickly reaches the temperature area where sulfur purge is possible. However, it rapidly increases higher than the temperature area in which sulfur purge is possible and enters into the thermal deterioration temperature danger zone where there is the risk of pronounced deterioration of the NOx occlusion reduction type catalyst. Furthermore, even after the temperature has been raised, the up and down motion of the normal map control line B is very large and deviates easily from the temperature area in which sulfur purge is possible. Conversely, although some temperature fluctuation is noticeable in the control, line A of the present invention, it is much smaller than that of the map control line B and the temperature is maintained in the temperature area where sulfur purge is possible.

INDUSTRIAL APPLICABILITY

For the desulfurization control method for the exhaust gas purification system and the exhaust gas purification system of the present invention having the outstanding results described above, at desulfurization control time, by setting the amount of fuel for raising temperature required to raise the temperature of the NOx conversion catalyst to the desulfurization target temperature, using the heat quantity calculated from a first heat quantity required to raise the temperature of the NOx conversion catalyst device and a second heat quantity required to raise the temperature of the exhaust gas, without calculating from existing map data, it is possible to put in a necessary and sufficient fuel quantity for raising temperature with excellent precision in order to reach the desulfurization target temperature and in order to maintain a state at or above the desulfurization target temperature, even during transient operation. As a result, it can be used extremely effectively as a desulfurization control method and exhaust gas purification system for the exhaust gas purification system of an internal combustion engine in an automobile.

What is claimed is:
1. A desulfurization control method for an exhaust gas purification system including a NOx conversion catalyst device with a NOx conversion catalyst that purifies the NOx in the exhaust gas of an engine, comprising:
carrying out desulfurization control, in order to recover a deterioration from sulfur poisoning of the NOx conversion catalyst by setting an amount of fuel for raising temperature required to raise the temperature of a first detection temperature indicating the temperature of the catalyst of the NOx conversion catalyst device, to a desulfurization target temperature by using a heat quantity calculated from a first heat quantity required to raise the temperature of the NOx conversion catalyst device and a second heat quantity required to raise the temperature of the exhaust gas; and
calculating the amount of fuel for raising temperature by calculating:
the first heat quantity by multiplying the difference between the desulfurization target temperature and the first detection temperature by the heat capacity of the NOx conversion catalyst device;
the second heat quantity by multiplying the difference between the desulfurization target temperature and the detection temperature of the exhaust gas introduced into the NOx purification device by the heat capacity of the exhaust gas;

a heat quantity for raising temperature by adding together the first heat quantity, the second heat quantity and a third heat quantity released from the exhaust gas purification system; and the amount of fuel for raising temperature by dividing the heat quantity for raising temperature by the low calorific value of the fuel.

2. The desulfurization control method for the exhaust gas purification system according to claim 1, wherein, the heat capacity of the exhaust gas is calculated by multiplying the specific heat of the exhaust gas by the sum of the amount of flow of the exhaust gas calculated from the amount of air intake and the amount of fuel injection.

3. The desulfurization control method for the exhaust gas purification system according to claim 1 or 2 in an exhaust gas purification system that positions an oxidation catalyst device upstream of the NOx conversion catalyst device;

wherein, when calculating the amount of fuel for raising temperature, the desulfurization control method adds a fourth heat quantity, which is calculated by multiplying the difference between the desulfurization target temperature and a second detection temperature indicating the temperature of the catalyst of the oxidation catalyst device by the heat capacity of the oxidation catalyst device, to the heat quantity for raising the temperature.

4. An exhaust gas purification system comprising:

a NOx conversion catalyst device with a NOx conversion catalyst that purifies the NOx in the exhaust gas of an engine; and a control device which carries out desulfurization control to recover a deterioration from sulfur poisoning of the NOx conversion catalyst;

wherein, by the desulfurization control, the control device sets an amount of fuel for raising temperature of a first detection temperature indicating the temperature of the catalyst in the NOx conversion catalyst device to a desulfurization target temperature by using the heat quantity calculated from a first heat quantity for raising the temperature of the NOx conversion catalyst device and a second heat quantity for raising the temperature of the exhaust gas, and wherein, the control device calculates:

the first heat quantity by multiplying the difference between the desulfurization target temperature and the first detection temperature by the heat capacity of the NOx conversion catalyst device;

the second heat quantity by multiplying the difference between the desulfurization target temperature and the detection temperature of the exhaust gas flowing into the NOx conversion catalyst device by the heat capacity of the exhaust gas; and the heat quantity for raising temperature by adding the first heat quantity, the second heat quantity and a third heat quantity released from the exhaust gas purification system and calculates the amount of fuel for raising temperature by dividing the heat quantity for raising temperature by the low calorific value of the fuel.

5. The exhaust gas purification system according to claim 4, wherein, the control device calculates the heat capacity of the exhaust gas by multiplying the specific heat of the exhaust gas by the sum of the amount of flow of the exhaust gas calculated from the amount of air intake and the amount of fuel injection.

6. The exhaust gas purification system according to either claim 4 or claim 5, which positions an oxidation catalyst device upstream of the NOx conversion catalyst device; wherein, when calculating the amount of fuel for raising temperature, the control device adds a fourth heat quantity to the heat quantity for raising temperature which is calculated by multiplying the difference between the desulfurization target temperature and the second detection temperature indicating the temperature of the catalyst of the oxidation catalyst device by the heat capacity of the oxidation catalyst device.

* * * * *